March 25, 1930.   L. S. ABBOTT   1,751,676
COMPOSITE TILE HANGER BAR
Filed April 4, 1927   3 Sheets-Sheet 1
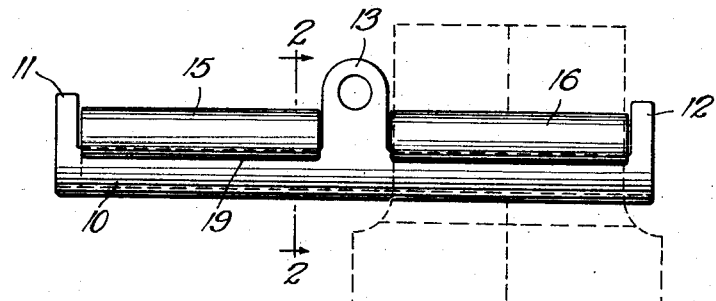
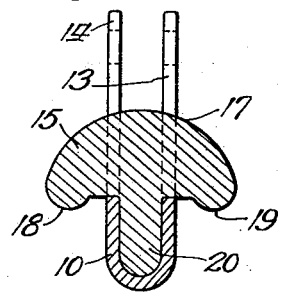
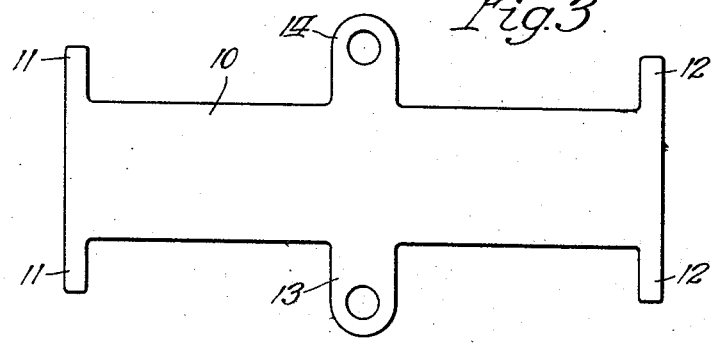
Inventor
Lyle Stockton Abbott
By Zabel & Banning Attys.

March 25, 1930.   L. S. ABBOTT   1,751,676
COMPOSITE TILE HANGER BAR
Filed April 4, 1927   3 Sheets-Sheet 2

Inventor
Lyle Stockton Abbott
By Zabel & Banning Attys.

March 25, 1930.  L. S. ABBOTT  1,751,676
COMPOSITE TILE HANGER BAR
Filed April 4, 1927  3 Sheets-Sheet 3
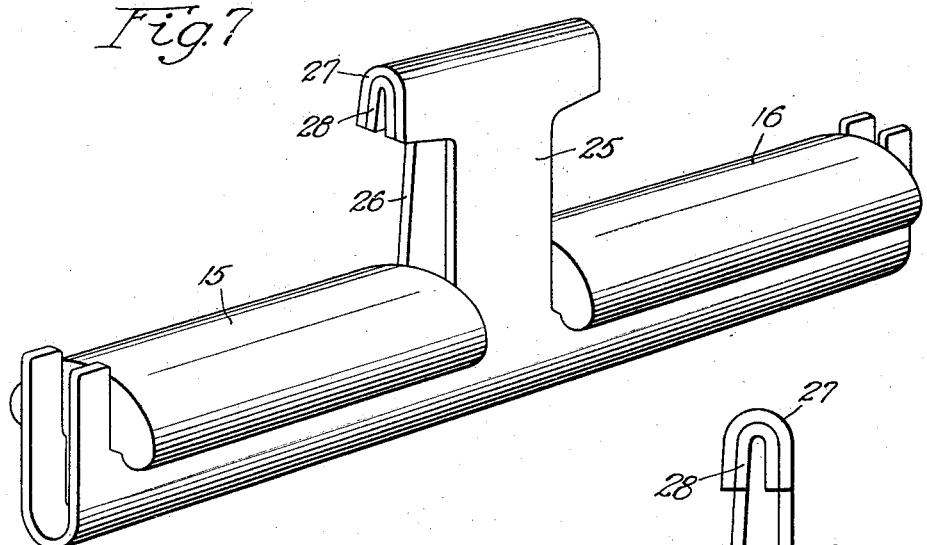
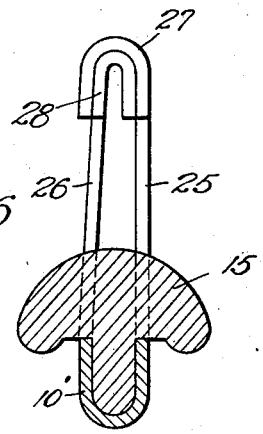
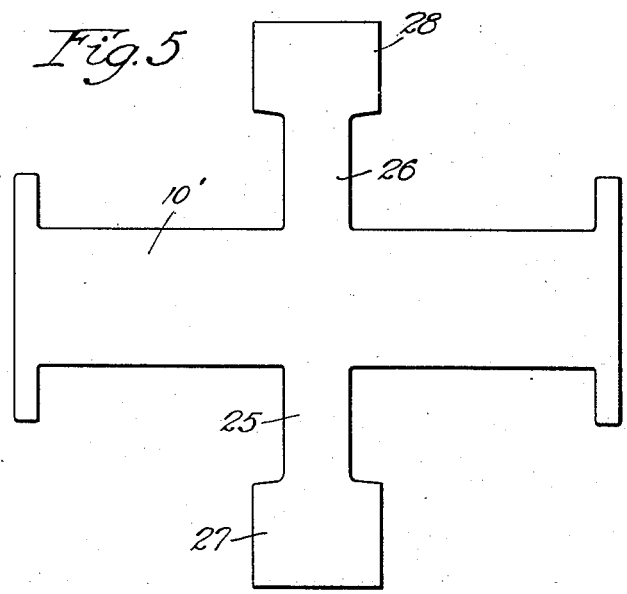
Inventor
Lyle Stockton Abbott
By Zabel & Banning Attys.

Patented Mar. 25, 1930

1,751,676

UNITED STATES PATENT OFFICE

LYLE STOCKTON ABBOTT, OF CHICAGO, ILLINOIS

COMPOSITE TILE-HANGER BAR

Application filed April 4, 1927. Serial No. 180,912.

My invention relates to hanger bars, particularly for use in suspending refractory tile in furnace constructions, and has for its purpose the provision of a hanger bar of this character that will have the necessary strength to support the weight of the refractory elements and will also not combine chemically with the materials in the fire clay so as to lose its supporting strength and become fragile and easily broken after a short period of service.

Fire clay such as used in the construction of refractory tile has a large amount of silica therein. Iron, particularly in the forms having considerable tensile strength, such as wrought iron or steel, will combine readily with the silica when subjected to the high temperatures reached in the operation of furnaces. The compound thus formed is extremely fragile and easy to break, and has very little tensile strength. In order to avoid this and to provide a hanger bar having the necessary strength, I provide a composite hanger bar which has a portion made up of such material as wrought iron or pressed steel, serving to carry the weight of the refractory members, and in addition has a portion made up of a material that does not readily combine with the refractory tile at the temperatures to which it is subjected in use in a furnace, the last named portion making direct contact with the refractory material, preventing contact between the first named portion and the refractory material.

I have found that gray iron, a form of cast iron, will not combine very readily with the refractories, and this may be used directly in contact with them. However, the best material I have found is a cast iron having a high silicon content. This iron naturally would not have much affinity for the silica in the refractory tile, since it already contains a large amount of silicon. Such an iron compound is inherently brittle and does not stand up well in service if the hanger bar were constructed entirely of it. Other compounds that will not combine with the silica in the fire clay to any great extent may also be used in contact with the tile members, but I have found the silicon iron to be very good for this purpose.

Another purpose of the invention is to so construct the hanger bar that the cast iron portion thereof will have no protruding thin or sharp portions that will be easily broken off either in casting and handling or in service.

Other objects and advantages will appear as the description proceeds, when taken in connection with the accompanying drawings. However, I am aware that various changes may be made in the details of construction without departing from the spirit of the invention, and I intend to avail myself of all such modifications as fall within the scope of the claims.

In the drawings:

Fig. 1 is a side view of my improved hanger bar showing the manner in which the tile are mounted thereon;

Fig. 2 is a section on line 2—2 of Fig. 1;

Fig. 3 is a plan view of the blank of pressed steel which is used to form the supporting part of the hanger bar;

Fig. 5 is a plan view of a slightly different form of blank used to form the hanger bar;

Fig. 6 is a sectional view through the hanger bar, showing the manner in which the blank is folded to provide a head for supporting the bar; and Fig. 7 is a perspective view of the completed bar made from the blank shown in Fig. 5.

Figure 4:
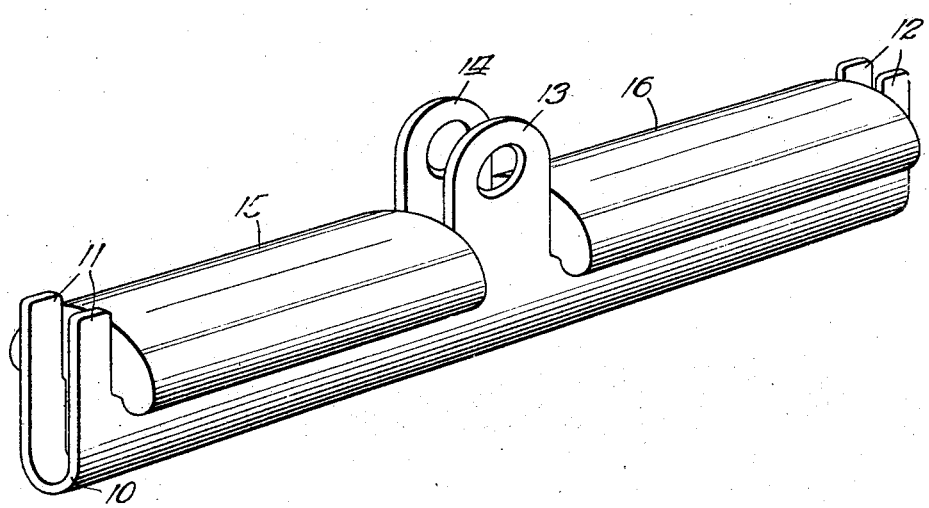
Fig. 4 is a perspective view of the hanger bar.

Referring now in detail to the drawings, the improved hanger bar is made up of a U-shaped portion 10, which, as hereinbefore stated, may be made of any suitable material having the requisite strength to carry the load to which it is subjected by the weight of the tile placed thereon. Preferably, these bars are constructed of wrought iron or pressed steel, both of which have a comparatively high tensile strength.

The U-shaped member shown in Fig. 1 and in cross section in Fig. 2 is made from a blank such as shown in Fig. 3, which has the projecting ears 11 and 12 at the opposite ends thereof, and the central projecting portions 13 and 14, which when the blank is folded form upwardly extending portions for a purpose which will presently appear. After the blank is bent into the form shown in Fig. 2, the elongated cast elements 15 and 16 are placed thereon to complete the hanger bar. These elements, it will be noted from Fig. 2, have a substantially rounded upper surface 17 and are somewhat wider than the width of the U-shaped portion 10, so that they extend beyond the sides thereof and are curved downwardly as at 18 and 19, and then extend inwardly to form shoulders resting upon the upper edges of the U-shaped portion. The members 15 and 16 are also provided with the downwardly extending rib 20 which fits between the legs of the U portion so as to firmly secure the cast elements in place upon the U-shaped portion.

The members 15 and 16 are of sufficient length to substantially fill the space between the projections 11 and 12 and the central projections 13 and 14 so as to provide a support for the tile members that will hold them up away from contact with the U-shaped member at all times. The projections 11 and 12 are preferably made of sufficient length to extend a short distance above the top of the members 15 and 16 so as to prevent removal of the tile over the ends of the hanger bar unless they are lifted upwardly to a slight extent.

These tile members have a round hole transversely therethrough, as shown in Fig. 1, to receive the hanger bar, and the upper surfaces of the cast members are preferably curved to correspond to this opening. These refractory tile are of substantially the same type as that shown in the patent granted to me under date of January 4, 1927, for Fire arches for furnaces, the patent number being 1,612,795. These refractory tile, as shown in the patent mentioned above, are used to form a roof for the furnace, and are naturally subjected to considerable heat. While the hanger bars are protected to a great extent by the tile members, the temperature often becomes great enough so that there is a tendency of the silica present in the fire clay to combine with the iron in the hanger bar chemically under the temperature and pressure, and this forms an iron compound which is quite fragile and will not withstand any severe blow to which the same may be subjected. Cast irons have been found to have less tendency to go into combination with the fire clay than the iron compounds having higher tensile strength, such as wrought iron and steel, and this is particularly true of the cast irons in which silicon is used in the place of carbon or at least in which a certain amount of silicon has been added in casting the element.

The members 16 are therefore preferably made up of silicon iron castings; but since these castings have a very low tensile strength and are easily broken, they cannot be subjected to any of the strain of carrying the blocks at a distance from the central support. It is with this difficulty in mind that I have provided the U-shaped supporting piece, which is maintained out of contact with the refractory material, for carrying the weight of the tile, and have used the silicon iron elements 15 and 16 to form a buffer between the U-shaped support and the refractory tile.

By this method of constructing the hanger bar I obtain the advantages of the silicon iron compound in contact with the tile, and in addition have a support which is capable of withstanding the strains to which it is put by the weight of the tile in the furnace arch.

It will be noted from the showing in Figs. 1 and 2 that the cast elements 15 and 16 are constructed throughout so as not to have any exposed sharp corners or thin projecting portions which are liable to be broken in handling after casting or in service upon the hanger bar. Also, by simply setting them upon the U-shaped member, if at any time one of the members 15 or 16 is broken so that it is no longer serviceable, it is only necessary to replace that member, and the entire hanger bar is not lost by such breakage. This lessens the cost of repairs, and also the danger of a section of the furnace arch dropping down due to the failure of the hanger bar.

In the form shown in Figs. 5 to 7, the construction of the U-shaped member and the cast elements is substantially that shown in Figs. 1 to 4 with the exception of the upwardly projecting portions 25 and 26 on the U-shaped member. These portions, as shown clearly in Fig. 5, are widened adjacent the outer ends to form the T-shaped heads 27 and 28, and when the blank is bent into U-shape these heads 27 and 28 are overlapped and bent downwardly to form a T-head by which the hanger bar is supported, should it be desired to support it in this manner rather than by having the end of the rod extend through the openings in the members 13 and 14. This makes a very rigid and substantial supporting head for the hanger bar.

From the foregoing description, it is thought that the construction and advantages of my improved hanger bar will be clear to those skilled in this art.

Having thus described my invention, what

I claim, and desire to secure by Letters Patent of the United States is:

1. A tile hanger bar comprising an elongated portion of metal having relatively high tensile strength and provided with means whereby the same may be secured to a support, said elongated portion being provided with a recess in the upper face thereof, and a portion of material having a relatively low tensile strength but capable of resisting chemical combination with refractory tile at high temperatures resting upon said elongated portion and adapted to support the weight of the refractory tile members thereon, said second named portion having a projection fitting in said recess.

2. A tile hanger bar comprising an elongated U-shaped portion of metal having relatively high tensile strength and provided with means whereby the same may be secured to a support, and a portion of material having a relatively low tensile strength but capable of resisting chemical combination with refractory tile at high temperatures seated in said U-shaped portion and adapted to support the weight of the refractory tile members thereon.

3. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said supporting member having projections at the opposite ends thereof to prevent said tile engaging member from sliding endwise.

4. A hanger bar of the character described comprising an elongated U-shaped supporting member having upwardly extending means intermediate the ends thereof for suspending said bar from a support, tile engaging members having the sides thereof projecting beyond the sides of said U-shaped member to hold the tile spaced from said sides, said tile engaging members being detachably mounted on said U-shaped members.

5. A hanger bar of the character described comprising an elongated U-shaped supporting member having upwardly extending means intermediate the ends thereof for suspending said bar from a support, and a tile engaging member resting upon, and having a portion extending downwardly into, said U-shaped member.

6. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said tile engaging member being constructed of cast iron.

7. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said tile engaging member being constructed of cast iron and said U-shaped member being constructed of an iron compound having a high tensile strength.

8. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said tile engaging member being constructed of an iron and silicon compound.

9. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said tile engaging member being constructed of an iron and silicon compound and said U-shaped member being constructed of pressed steel.

10. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said upwardly extending means comprising a pair of projections extending upwardly to form a stem for said bar and bent together to form a supporting head.

11. A hanger bar of the character described comprising an elongated U-shaped supporting member having upwardly extending means intermediate the ends thereof for suspending said bar from a support, and a tile engaging member resting upon, and having a portion extending downwardly into, said U-shaped member, said upwardly extending means comprising a pair of projections having enlarged upper ends overlapped to provide a supporting head.

12. A hanger bar of the character described comprising an elongated U-shaped member, having projecting portions extending upwardly from the sides thereof at each end and adjacent the center thereof, and elongated blocks having portions extending into said U-shaped member extending between said end projections and central projections.

13. A hanger bar of the character described comprising an elongated U-shaped member, having projecting portions extending upwardly from the sides thereof at each end and adjacent the center thereof, and elongated blocks having portions extending into said U-shaped member extending between said end projections and central projections, said blocks having rounded upper faces and projecting outwardly and downwardly from the upper edges of said U-shaped portion.

In witness whereof, I hereunto subscribe my name this 29th day of March, A. D., 1927.

LYLE STOCKTON ABBOTT.